Patented Aug. 31, 1948

2,448,052

UNITED STATES PATENT OFFICE 2,448,052

ACTIVE MATERIAL FOR ALKALINE CELLS AND METHOD OF PREPARING SAME

Ralph Roberts, Eastport, Md.

No Drawing. Application May 14, 1945,
Serial No. 593,584

7 Claims. (Cl. 136—24)

(Granted under the act of March 3, 1883, as amended April 30, 1928; 370 O. G. 757)

This invention relates to alkaline secondary batteries having cadmium negatives, and more particularly to active materials for the cadmium negative of alkaline cells and methods of preparing same.

An object of this invention is to provide a lightweight, alkaline storage battery of high capacity and whose capacity does not decrease until after many cycles of charging and discharging.

Another object of the invention is to provide expanders for the cadmium negative of alkaline cells of the Jungner type (cadmium-nickel), whereby the capacity of the cells is increased and the characteristics of the cells are improved in other important respects.

A further object of the invention is to provide active materials for the cadmium negative of alkaline cells containing expanders which slowly hydrolyze or swell in alkaline electrolyte and thus prevent contraction of the cadmium metal during cycling.

Another object of the invention is to provide methods of preparing active materials for alkaline cells whereby an expander of the siliceous or cellulosic type is intimately mixed with the active metal.

With these and other objects in view, the invention comprises the novel compositions and methods of preparing same, described in detail below and set forth in the claims.

I have found that the capacity of cadmium cells can be increased and the cells improved in other respects by providing the cadmium negative with a small proportion of an expander which slowly hydrolyzes or swells and prevents the contraction of the cadmium. In general, the expanders found to be satisfactory are of the siliceous or cellulosic type, either alone or combined.

Examples of effective expanders of the siliceous type are porcelain, koalin, clay, amorphous silica, such as diatomaceous earth, and the like. It is preferred that the siliceous material be capable of assuming colloidal or gelatinous characteristics in alkaline solutions. Hydrous aluminum silicates such as bentonite and other colloidal clays are suitable. These siliceous materials are employed in small proportions, preferably at least 0.5% of the total weight of the active material. The siliceous materials are either mixed in finely divided form with cadmium or cadmium compounds prior to reduction, or in some cases sufficient siliceous material may be incorporated in the active material by reducing the cadmium compounds in a cathode compartment having a siliceous diaphragm. Siliceous compounds, such as porcelain, tend to hydrolyze in the alkaline electrolyte of the formation cell, and the hydrolysis products diffuse from the siliceous diaphragm into the active material.

Any water-insoluble cellulosic material which is gelatinous and is capable of swelling in alkaline solutions may be used as an expander for the cadmium negative in alkaline cells, preferably in proportions of at least 0.5% of the total weight of the active material. Cellulose or cellulose derivatives, such as cellulose esters, may be converted to a suitable form by precipitation from solution. For example, cellulose acetate is converted to a gelatinous form by dissolving it in an organic solvent, such as acetone, ethylmethyl-ketone, or other ketone, and then precipitating free cellulose or a lower acetate by pouring the cellulosic solution into an alkaline solution.

It is preferred to coprecipitate cadmium hydroxide and cellulose or cellulose derivative so that the cellulose or cellulose derivative is highly dispersed and intimately mixed with the metal compound. Coprecipitation may be effected by dissolving the cellulose or cellulose derivative in a solvent and then simultaneously pouring this solution and a solution of a water-soluble cadmium salt into an alkaline aqueous solution.

The following specific examples illustrate preferred compositions and preferred procedures, but it is to be understood that the invention is not limited thereto.

Example 1

An intimate mixture of cadmium hydroxide and cellulose was prepared by coprecipitation, utilizing the following reagents:

|  | Milliliters |
| --- | --- |
| An aqueous solution of cadmium sulfate containing 104.2 grams of $CdSO_4$ | 250 |
| A solution of cellulose acetate in acetone containing 1.41 grams of cellulose acetate | 250 |
| An aqueous solution of potassium hydroxide containing 70.1 grams of KOH | 250 |

The potassium hydroxide solution was heated to about 80° C., and the solutions of cadmium sulfate and cellulose acetate were added simultaneously thereto, at about the same rate and with agitation. The time required for the addition of the reagents was about two hours. The coprecipitate, a mixture of cadmium hydroxide and cellulose, was washed by decantation, filtered, and dried at about 110° C.

The cadmium hydroxide in the coprecipitate was converted to cadmium metal in a formation cell having a cathode compartment separated from the anode compartment by means of a graphite diaphragm. The coprecipitate was packed in thin layers into the cathode compartment of the cell, with intervening ten-mesh nickel screen in contact with a nickel screen lead. The anode was a nickel screen, and the electrolyte was a solution of potassium hydroxide having a specific gravity of 1.20. A current of about 600 milliamperes was passed through the cell until vigorous gassing occurred and no unconverted compound was visible in the cathode compartment. The resulting mixture of cadmium metal and cellulose was removed and washed by decantation, filtered, washed with ethyl alcohol, and air dried. After grinding and screening through a sixty-mesh sieve, the material was ready for use as active material.

This active material, containing about 0.97% cellulose, was tested by packing it into the negative pockets of a cell, having three negatives and two nickel oxide positives in a potassium hydroxide electrolyte. The cell was initially charged at 750 milliamperes (12 ampere-hours), and discharged at 900 milliamperes. In subsequent cycles, a ratio of about 1.4 was maintained between ampere-hours of charge and ampere-hours of discharge. The specific capacity of this active material increased from an initial value of about 0.189 ampere-hours per gram of cadmium to a value of about 0.247 ampere-hours per gram of cadmium in the 70th cycle. When active material was prepared from cadmium hydroxide in the same manner except that the cellulose expander was omitted, the specific capacity was only 0.169 initially and remained at about this value for eighty cycles of charging and discharging under the same conditions.

*Example 2*

A similar sample of cadmium hydroxide and cellulose, containing 0.50% cellulose, was prepared in the same manner as in Example 1 except that a porous porcelain cup was substituted for the graphite diaphragm in the formation cell. The alkaline electrolyte reacted with the porcelain, resulting in the addition of 1.05% of siliceous material to the active material comprising 0.50% cadmium. When tested in the same manner as Example 1, the specific capacity increased from an initial value of 0.210 to a value of 0.250 in the 100th cycle; whereas, when the siliceous and cellulosic materials were omitted, the specific capacity was only 0.169.

*Example 3*

Active material, containing 1.85% of porcelain and 1.00% of cellulose, was perepared in the same manner as Example 1 except that finely divided porcelain (less than 150 mesh) was mixed with the coprecipitate of cadmium hydroxide and cellulose. The specific capacity of this active material increased from an initial value of 0.244 to a value of 0.287 in the 70th cycle; whereas, when the siliceous and cellulosic materials were omitted, the specific capacity was only 0.169.

While it is preferred to utilize cadmium hydroxide, as in the above examples, other cadmium compounds may be used as the source of the cadmium metal in the active materials. Cadmium oxide or other water-insoluble cadmium compound may be reduced in the formation cells, described above, with admixed cellulosic or siliceous compounds, or siliceous compounds may be supplied by a siliceous diaphragm in the formation cell. A sample of active material formed from cadmium oxide in the formation cell of Example 1, and containing about 1.42% of finely divided porcelain, had an initial specific capacity of about 0.159 and a specific capacity of 0.211 in the 70th cycle. A similar sample containing about 1.51% of diatomaceous earth had an initial specific capacity of about 0.158 and a specific capacity of 0.202 in the 70th cycle.

Obviously many modifications and variations of the invention, as hereinbefore described, may be made without departing from the spirit and scope thereof, and therefore only such limitations should be imposed as are indicated in the appended claims.

The invention described herein may be manufactured and used by or for the Government of the United States of America for governmental purposes without the payment of any royalties thereon or therefor.

I claim:

1. Active material for the cadmium negative of alkaline cells comprising cadmium and a small proportion of cellulosic material adapted to prevent contraction of the cadmium during cycling.

2. Active material for the cadmium negative of alkaline cells prepared by the reduction of coprecipitated cadmium hydroxide and cellulosic material.

3. Active material for the cadmium negative of alkaline cells comprising cadmium and a small proportion of an expander comprising a mixture of a siliceous material and a cellulosic material.

4. In a method of preparing cadmium negatives for alkaline cells, the step of coprecipitating a cadmium compound and a cellulosic expander.

5. In a method of preparing active material for the cadmium negatives of alkaline cells, the step of adding a solution of a cadmium salt and a cellulosic solution simultaneously to an alkaline solution to form a coprecipitate of cadmium hydroxide and cellulosic compound.

6. A method of preparing active material for the cadmium negatives of alkaline cells which comprises adding an aqueous solution of a cadmium salt and a solution of a cellulose ester in an organic solvent simultaneously to a solution of an alkali metal hydroxide to form a coprecipitate of cadmium hydroxide and cellulosic compound, and reducing the cadmium compound in said coprecipitate to free metal.

7. Active material for the cadmium negative of alkaline cells comprising finely-divided cadmium and a small proportion of a mixed expander consisting of precipitated cellulose and finey-divided porcelain.

RALPH ROBERTS.

REFERENCES CITED

The following references are of record in the file of this patent:

UNITED STATES PATENTS

| Number | Name | Date |
|---|---|---|
| 756,176 | Meygret | Mar. 29, 1904 |
| 871,214 | Edison | Nov. 19, 1907 |
| 917,875 | Jungner | Apr. 13, 1909 |
| 1,555,438 | Sato | Sept. 29, 1925 |
| 1,687,307 | Oppenheim | Oct. 9, 1928 |
| 1,929,357 | Johnstone | Oct. 3, 1933 |
| 2,030,717 | Reinhardt | Feb. 11, 1936 |

FOREIGN PATENTS

| Number | Country | Date |
|---|---|---|
| 239,609 | Great Britain | Sept. 14, 1925 |

OTHER REFERENCES

Crennell and Lea, Alkaline Accumulators (1928), pages 112–3.

Hauel, A. P., Trans. Electrochemical Socy., vol. 76 (1939), pages 442–3.